United States Patent
Taiana

(10) Patent No.: US 9,522,439 B2
(45) Date of Patent: Dec. 20, 2016

(54) APPARATUS AND METHOD FOR ELECTRICAL ROLLER SEAM WELDING USING A WIRE ELECTRODE

(75) Inventor: Peter Taiana, Neuenhof (CH)

(73) Assignee: Soudronic AG, Bergdietikon (CH)

( * ) Notice: Subject to any disclaimer, the term of this patent is extended or adjusted under 35 U.S.C. 154(b) by 546 days.

(21) Appl. No.: 14/118,682

(22) PCT Filed: Apr. 26, 2012

(86) PCT No.: PCT/CH2012/000091
§ 371 (c)(1),
(2), (4) Date: Jul. 28, 2014

(87) PCT Pub. No.: WO2012/155277
PCT Pub. Date: Nov. 22, 2012

(65) Prior Publication Data
US 2014/0353282 A1  Dec. 4, 2014

(30) Foreign Application Priority Data
May 19, 2011 (CH) .......................... 863/11

(51) Int. Cl.
*B23K 11/06* (2006.01)
*B23K 11/30* (2006.01)
*B23K 11/00* (2006.01)

(52) U.S. Cl.
CPC ............ *B23K 11/062* (2013.01); *B23K 11/002* (2013.01); *B23K 11/066* (2013.01); *B23K 11/309* (2013.01); *B23K 2201/06* (2013.01); *B23K 2201/125* (2013.01)

(58) Field of Classification Search
CPC ......... B23K 11/08; B23K 11/06; B23K 11/30; B23K 11/062; B23K 11/002; B23K 11/066; B23K 11/309; B23K 2201/06; B23K 2201/125
See application file for complete search history.

(56) References Cited

U.S. PATENT DOCUMENTS 4,830,094 A * 5/1989 Pazzaglia ............ B23K 11/309
165/47

FOREIGN PATENT DOCUMENTS

| JP | 5772781 A | 5/1982 |
| JP | 61242769 A | 10/1986 |
| JP | 2001062568 A | 3/2001 |

OTHER PUBLICATIONS

International search report for PCT/CH2012/000091 dated Jul. 23, 2012.

* cited by examiner

*Primary Examiner* — Brian Jennison
(74) *Attorney, Agent, or Firm* — McCormick, Paulding & Huber LLP

(57) ABSTRACT

In a welding apparatus for the longitudinal seam welding of can bodies (31') by way of electrode rollers (8, 17), three drive stages (4, 10, 20), by means of which the wire electrode (25) is driven in addition to the drive by the electrode rollers (8, 17), are provided in the wire course. Preferably, elastic stretching is brought about in this case by the three drive stages (4, 10, 20).

10 Claims, 2 Drawing Sheets

APPARATUS AND METHOD FOR ELECTRICAL ROLLER SEAM WELDING USING A WIRE ELECTRODE

REFERENCE TO RELATED APPLICATIONS

This application claims the priority of Swiss Patent Application No. 0863/11 of May 19, 2011, and claims the benefit of PCT Application No. PCT/CH2012/000091, filed on Apr. 26, 2012, and the whole content of this application is hereby included by reference.

BACKGROUND OF THE INVENTION

1. Technical Field

The invention relates to a welding apparatus for electrical seam welding, with a first electrode roller and a second electrode roller, wherein the welding path of the welding device for the objects to be welded extends between the electrode rollers and wherein a common wire electrode runs on the electrode rollers and adopts a predefined path in the device, wherein the second electrode roller is driven by its own drive for rotating with the adjustable nominal welding speed. Furthermore, the invention relates to a method for electric resistance welding container bodies which pass between a first and a second electrode roller, on which a common wire electrode (25) runs, with at least one of the electrode rollers being driven, as well as a preferred use of the method for seam welding of container bodies.

2. Prior Art

Seam welding devices are known and are for example used for manufacturing can bodies, this also being a preferred field of use of the present invention. In case of welding can bodies, the can bodies are transported between the welding electrode rollers with high speed and with as small as possible distances between subsequent bodies. The can bodies, which at the beginning are open along their later longitudinal welding seam, are forced to close on their way towards the welding zone by a so-called Z-rail and in the welding zone by welding tools and are brought into the welding zone with a defined overlapping of the longitudinal edges of the body, in which zone the electric resistance welding with the electrode rollers takes place. A common wire electrode runs on the electrode rollers, which is freshly supplied from a supply roll and is disposed of after the welding as used material. The lower electrode roller arranged at a welding arm is located inside the can bodies to be welded and is not actively driven by an own drive but indirectly via the wire electrode and the can bodies. The upper electrode roller, which is located outside the body to be welded, is driven by an active drive with the desired nominal welding speed. Such devices are known and are described for example in DE 40 31 825 A1. In this document, a path of the wire electrode in a welding device according to the prior art is also shown. Is has to be noted that the welding quality, particularly in the presence of a high throughput speed of hundreds of can bodies per minute, is strongly influenced by possible speed differences between the lower and the upper electrode rollers, even when this difference is small.

SUMMARY OF THE INVENTION

It is the object of the invention to provide an improved welding device which yields a high welding quality also in case of a high welding speed.

This objective is solved in such a way that, additionally to the drive of the wire electrode by the driven electrode roller, three drive stages are provided for the wire electrode in such a manner that the first drive stage acts upon the wire electrode before the first electrode roller in the path of the wire, that the second drive stage acts upon the wire electrode between the first electrode roller and the second electrode roller in the path of the wire and that the third drive stage acts upon the wire electrode after the second electrode roller in the path of the wire.

Because three drive stages are used for driving the wire electrode and being arranged in the wire path as claimed, the result is a more constant wire speed and speed differences between the two electrode rollers can be minimized. It has been noted that by this symmetric welding conditions at the body inner side of the seam and at the body outer side of the seam are easier to reach and the welding quality is increased. As well, differences in the tensile stress of the wire, which acts along the path of the wire onto the wire, are minimized and load differences in the wire drive are diminished. The influence of the wire profiling before welding and the influence of the wire cutting after welding on the wire loop between the two electrode rollers is significantly reduced. It can further be observed that a constantly smaller distance between subsequent bodies can be reached by the three drive stages. This leads to lesser settling oscillations of the electrode rollers caused by the distance between can bodies.

Preferably, the welding device is designed in such a way that at least two of the drive stages have a common drive motor for driving the wire electrode. This enables a simple construction and a constant influence of the three drive stages on the wire electrode. It is therefore particularly preferred that all three drive stages have a common driving motor. All types of motors which can be controlled or regulated known to the skilled person can be used, particularly electric motors. The drive stages are controlled by the controller of the welding device. Preferably, the drive of the wire electrode is done mechanically in such a way that the drive stages have each at least a drive roller which is partly or entirely wound around by the wire electrode which thus forms a part of a loop or a full loop around the drive roller. Therefore, a friction locking drive of the wire electrode on the rollers of the drive stages takes place.

It is particularly preferred that the drive rollers of the drive stages have different diameters, wherein the drive roller of the first drive stage has a smaller diameter than the drive roller of the second drive stage, and particularly additionally the drive roller of the third drive stage has a larger diameter than the drive roller of the second drive stage. In this way it is possible to determine the tensile stress on the wire electrode and to keep deviations of the tensile stress in the path of the wire small by means of two of the drive stages, preferably however by means of all three drive stages. The drive stages may therefore cause a defined tensile stress on the wire and therefore cause a defined elastic wire stretching of the wire electrode along the path of the wire from the first drive stage up to the second drive stage and preferably up to the third drive stage. The elastic stretching is preferably applied where the wire electrode is guided around a very small deflecting roller, wherein for the rest comparatively large roller diameters are used for the rollers, particularly deflecting rollers, along the path of the wire in the welding device. Consequently it is preferred that a roller deflecting the wire electrode is provided in the path of the wire before the first electrode, particularly directly before the first electrode, the diameter of which is in the range of 70% to 30% of the diameter of the first electrode roller, and the diameter of which is particularly 50% of the diameter of the first electrode roller. Furthermore it is preferred for said aim that a deflecting roller deflecting the wire electrode is provided in the path of the wire after the second electrode, particularly directly after the second electrode, the diameter of which is smaller than around 50% of the diameter of the second electrode roller and is particularly in the range of 40% to 20% of the diameter of the second electrode.

The method of drawing the wire electrode at three positions has the advantages described above for the device.

In case of a preferred variation of the method it is acted upon the wire electrode by the drive stages in order to influence the wire tensile stress on the wire electrode in such a way that the wire is elastically stretched in the areas between the drive stages by at least two subsequent drives of the three drives or drive stages, respectively, in such a way that the second drive is faster than the first drive and/or the third drive is faster than the second drive. Thereby the stretching is of about 0.5%.

Furthermore, the wire electrode can be influenced in terms of the set welding speed by the second drive preferably in such a manner that the second drive drives the wire electrode around 0.1% slower than the welding speed.

The preferred use of the welding device or use of the method respectively is the longitudinal seam welding of can bodies. Thereby, the potential advantages of the welding device or the method and their preferred embodiments are particularly useful because in case of can welding flawless and leak-proof welding seams have to be created at very high cadences.

BRIEF DESCRIPTION OF THE DRAWINGS

Embodiments of the invention are described in the following in more detail by means of the figures.

DESCRIPTION OF PREFERRED EMBODIMENTS

Figure 1:
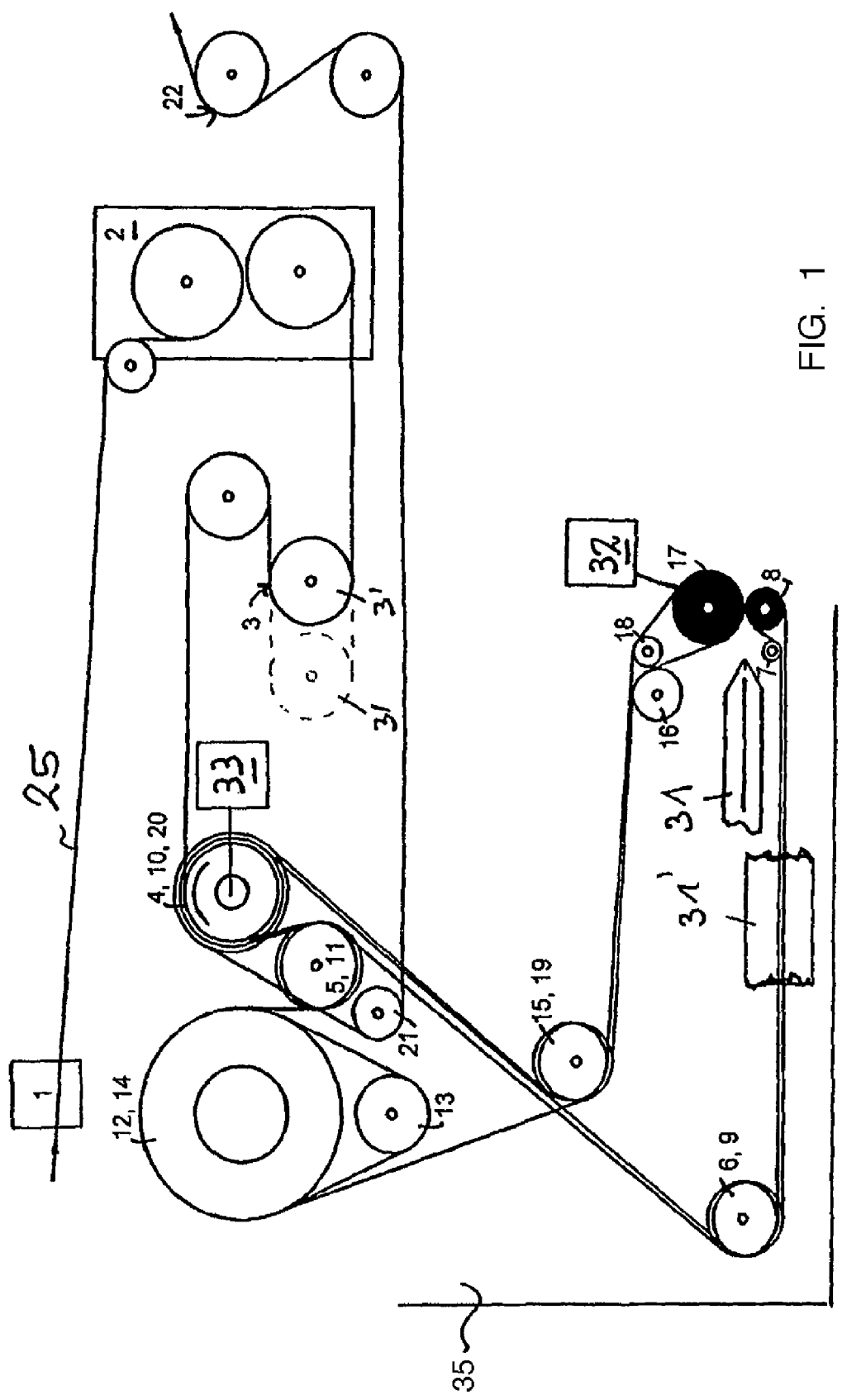
FIG. 1 shows schematically a welding device with a view on the path of the wire within the welding device.
Figure 2:
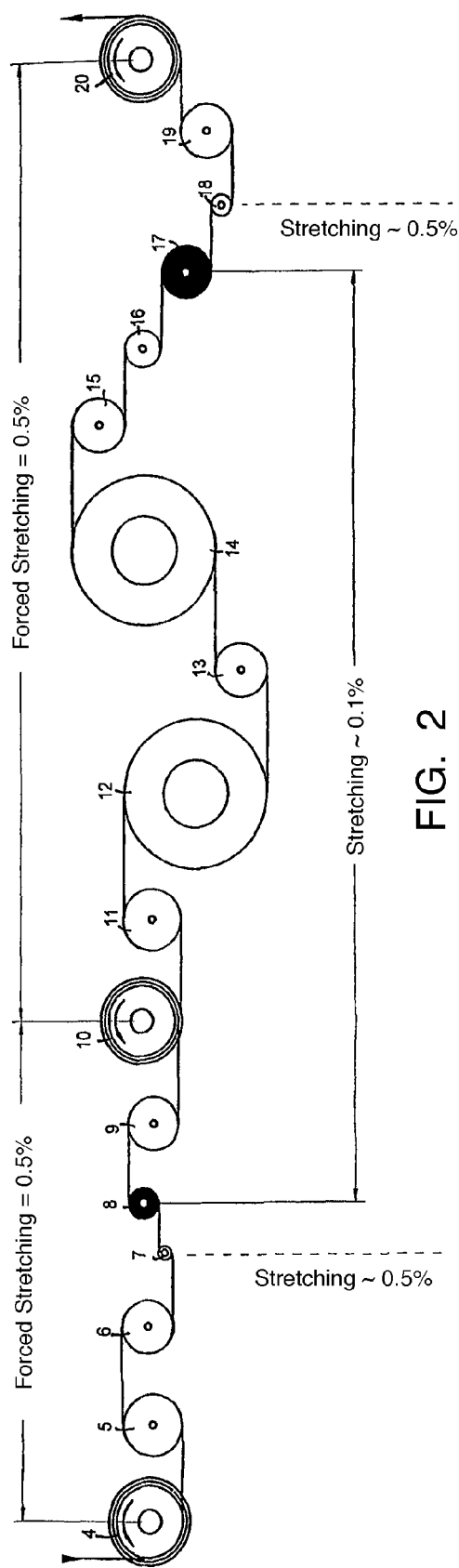
FIG. 2 shows the path of the wire according to FIG. 1 in a linear sequence for an easier description of the path.

The construction and the function of an embodiment of the invention are explained by means of FIGS. 1 and 2. FIG. 1 shows roughly indicated by two lines and schematically an electric resistance welding machine or welding apparatus 35 respectively, with the electrode rollers 17 and 8 facing each other. The electrode rollers are electrically connected with the welding current supply, which is not shown, of the welding device. Thus, the welding zone is located between the electrode rollers 17 and 8 or in other words the welding path for the objects to be welded, preferably the can bodies, is located between the electrode rollers. FIG. 1 further shows the elements of the welding device, which define the path of the wire. Thereby, FIG. 1 shows an illustration in which the arrangement of the elements defining the path of the wire is shown in the same way as it can be the case for a real welding device. On the contrary, FIG. 2 shows the linearly arranged illustration of the elements of FIG. 1 defining the path of the wire, serving only for the explanatory description of the sequential arrangement of the elements along the path of the wire and not being used in this way in a real device.

Such a welding device serves, according to the use preferred herein, for welding the longitudinal seams of can bodies 31'. They are rounded from planar metal sheet sections into an only hinted at so-called Z-rail 31 and transported along the latter towards the electrode rollers of the welding device, wherein the longitudinal edges of the still open body are overlapped. The overlapping is adjusted in a precise way in the welding area by means of welding tools not shown, particularly of a roller and cage assembly, and the overlapping seam is welded by the electrode rollers. The electrode roller 8 being the "lower" one in this preferred use, which in the following will be called first electrode roller 8, lies inside the can body and the electrode roller 17 being the "upper" one in this preferred use, which in the following will be called second electrode roller, lies outside the body or outside the objects to be welded respectively. This second electrode roller is rotatingly driven by means of a controlled or regulated drive 32 of the welding device, which is only shown by a box in the figure and by means of which the desired welding speed is determined. This is known to the skilled person and does not have to be explained in more detail here. It is also known that a wire electrode 25 runs on the electrode rollers, by which the welding current is actually applied to the weld seam. The document DE 40 31 825 A1 mentioned at the beginning describes a welding device of the known type.

In case of the welding device shown herein, a wire entry 1 into the welding device 35 is provided for the wire electrode, wherein the wire entry does not have a particular meaning for the present invention and is only indicated by a box in FIG. 1. The wire supplied from a supply roll enters the welding device here. The welding device normally has a profiling station 2 for the wire, inside which the wire is provided with a profile which is advantageous for the welding. A wire compensating station 3 with at least a roller which is movable in reciprocating way (indicated by the roller 3' in two different positions) creates a compensation or a buffer respectively, between the wire supply from the profiling station and the wire drive in the welding device, wherein this is particularly important during the start up and stopping of the welding device. This is known to the skilled person and will not be further explained here.

In an example according to the invention the first drive stage 4 for the wire follows in the path of the wire and here starts also the illustration of FIG. 2, which shows this drive stage 4 as first element of FIG. 2. The wire is driven in the first drive stage 4 by a drive 33 of the drive stage 4 with a pre-defined speed. This is preferably done in such a way that the wire winds partly or entirely around the drive roller of the drive stage 4 driven by a drive motor, such that the wire is driven by friction contact with the drive roller. Thereafter, the electrode wire 25 runs over two deflecting rollers 5 and 6 towards the lower welding arm of the welding device, where also the indicated Z-rail 31 is located, such that the wire electrode runs along the lower welding arm towards the lower welding electrode 8 which is partly embraced by the wire and where the wire forms the electrode for welding the can body. A deflecting roller 7 is provided along the wire path in front of the lower welding roller 8, which deflects the welding electrode towards the welding roller 8. This deflecting roller 7 preferably has a diameter which is smaller than the diameter of the lower electrode roller 8, and particularly is of only 70% to 30% of the diameter of the electrode roller and is particularly of around 50% of its diameter.

The wire is guided over a further deflecting roller 9 after the lower welding roller 8 and out of the welding arm towards the second wire drive stage 10. The second drive stage 10 preferably also includes a driven roller which transports the wire by friction contact, in such a way that the wire is partly or entirely wound around the roller. Preferably, the drive stage 10 has the same drive 33 as the drive stage 4, such that the driven roller of the first drive stage 4 and the driven roller of the second drive stage 10 are driven by the same drive 33 which is preferably a controlled or regulated electromotive drive.

After the second drive stage 10, the wire reaches the upper welding roller 17. Further deflecting rollers and also cooling rollers for the wire may be provided along the path of the wire in that direction. In the shown example, a deflecting roller 11, a first cooling roller 12, a further deflecting roller 13 and a second cooling roller 14 are provided. After the second cooling roller 14 the wire 25 reaches via the deflecting rollers 15 and 16 the driven upper electrode roller 17 on which the wire runs or which embraces the electrode roller respectively, and forms the actual welding electrode as wire electrode.

Preferably a deflecting roller 18 with a small diameter follows after the upper electrode roller 17, which deflecting roller 18 has a diameter which is smaller than 50% of the diameter of the electrode roller 17 and which particularly has a diameter of 40% to 20% of the diameter of the electrode roller 17. The third drive stage 20 follows after this deflecting roller 18 with small diameter, if need be with a further intermediary deflecting roller 19. The third wire drive stage 20 preferably has the same drive 33, particularly an electric motor, like the first and the second drive stage, could however also have an own drive. The third drive stage 20 has a further driven roller which is driven by the motor of the drive stage, which drives the wire by friction contact, in such a way that the wire is partly or entirely wound around this drive roller of the third drive stage 20.

After that, the wire can be guided via a further deflecting roller 21 to an ordinary wire cutter 22 which shreds the wire as reusable debris.

The wire drive shown here as an example with three drive stages offers the above mentioned advantages. The three drive stages drive the electrode wire with a speed which corresponds to the welding speed and thus in such a way that no slip occurs between the driven electrode roller 17 and the wire electrode running on the electrode roller.

However, the wire drive is preferably carried out for the three drive stages not with the same speed of the stages but with increasing stage speed along the path of the wire, such that a precisely defined tensile stress acts upon the wire in the path of the wire by means of the three drive stages, by means of which the wire is subjected to a defined elastic stretching. Preferably, the stretching caused by the different drive speeds is effected to the wire at defined positions, where the tension of the wire has a stretching effect caused by the second and third drive stages, by means of comparatively small deflecting rollers positioned along the path of the wire. The different drive speeds are preferably generated in such a way that the three drive rollers in the three drive stages 4, 10 and 20 are driven in the wire drive by the same drive means 33, i.e. the same electric motor and particularly servo motor, by arranging the three drive rollers on the same axle of the motor, however such that the diameters of the three drive rollers for the wire are slightly different by a pre-defined value in the three drive stages 4, 10 and 20, such that for each a different speed results in the presence of the same rotation speed of the rollers for the wire actuated by them. This leads to the preferred stretching of the wire.

In the shown example it is shown in FIG. 2 that the drive speed for the wire electrode amounts in the first drive stage 4 to only 99.5% of the drive speed of the wire electrode in the second drive stage 10, which is therefore considered here as 100%. The wire electrode is forced to elastically stretch by 0.5%. The forced stretching of 0.5% is a preferred value, a stretching in the range of 0.3% to 0.7% is equally possible and can be realised by a corresponding speed difference of the two drive stages. This stretching is effected in practice to the wire along the wire path where the wire electrode is deflected around a roller 7 with small diameter. In the preferred example this is a deflecting roller 7 which is placed in the wire path directly before lower electrode roller 8. A small diameter means a diameter of the roller 7 which amounts to around 70% to 30% of the diameter of the lower roller electrode 8. A diameter of the small roller 7 of around 50% of the diameter of the first or lower electrode roller 8 respectively is preferred.

Between the second drive stage 10 and the third drive stage 20 a further forced elastic stretching of also 0.5% is preferably provided in such a way that the third drive drives the wire electrode with an drive speed of 100.5%. Also in this case a forced stretching of 0.5% is a preferred value but a stretching in the range of 0.3% to 0.7% is also possible and can be reached by a corresponding design of the third drive stage 20. This stretching of the wire electrode is also preferably effected to the wire in the wire path at a position where a roller with a comparatively small diameter is provided, and this roller follows, particularly directly follows, the upper or second electrode roller respectively in the wire path. In the shown example it is the roller 18. It particularly has a diameter which amounts to less than 50% of the diameter of the electrode roller 17 and particularly has a diameter of only 40% to 20% of the diameter of the electrode roller 17.

The forced stretching of the electrode wire results in a more constant tensile stress on the wire before and after the electrode rollers of the welding device (preferably between the first and the second drive stage as well as between the second and the third drive stage) and thereby results in a constant throughput of the copper wire or wire electrode, respectively, through the welding device. This is advantageous for the welding quality. Instead of the double stretching by means of all three drive stages only a single stretching between two neighbouring drive stages may be provided. It is preferred that all rollers between the two electrode rollers have each a diameter which is larger than or equal to the diameter of the lower electrode roller 8.

Furthermore, the influences of cutting imprecisions of the bodies and of brows at the cutting edges on the welding are reduced. These imprecisions and brows cause different friction forces in the Z-rail and the welding tools.

It is further preferred, as shown in FIG. 2, that the drive speed of the second drive stage amounts to 100% of the welding speed, or it may also preferably have a speed that is 0.1% smaller than the welding speed which is determined by the drive of the upper electrode roller. By this a very small but preferred stretching of the wire electrode of 0.1% can result between the lower electrode roller 8 and the upper electrode roller 17, as this is noted in FIG. 2.

Thus in a welding device for longitudinal seam welding can bodies with electrode rollers 8, 17 three drive stages are provided in the wire path 4, 10, 20, by means of which the wire electrode is driven additionally to the drive by the driven electrode roller. It is preferred that an elastic stretching of the wire electrode is carried out by the three drive stages.

The preferred use of the invention is the longitudinal seam welding of can bodies.

LIST OF REFERENCE NUMERALS

1 Wire entry
2 Wire profiling

3 Wire compensation
4 First drive stage
5 Deflecting roller
6 Deflecting roller in the welding arm
7 Deflecting roller towards the lower welding rolled
8 Lower welding roller
9 Deflecting roller from welding arm
10 Second drive stage
11 Deflecting roller
12 Cooling roller
13 Deflecting roller
14 Cooling roller
15 Deflecting roller
16 Deflecting roller
17 Upper welding roller
18 Deflecting roller
19 Deflecting roller
20 Third drive stage
21 Deflecting roller
22 Supply to wire cutter
25 Wire electrode
31 Z-rail
31' Can body
32 Drive electrode roller
33 Drive for wire rollers

The invention claimed is:

1. Welding device (35) for electric seam welding, with a first electrode roller (8) and a second electrode roller (17), wherein the welding path of the device for the objects to be welded lies between the electrode rollers and wherein a common wire electrode (25) runs on the electrode rollers, which adopts a predefined wire path in the device, wherein the second electrode roller (17) is driven by an own drive (32) for rotating with the adjustable nominal welding speed, characterized in that three drive stages (4, 10, 20) are provided for the wire electrode in addition to the drive of the wire electrode by the driven electrode roller, in such a way that the first drive stage (4) acts upon the wire electrode in the path of the wire before the first electrode roller (8), that the second drive stage (10) acts upon the wire electrode in the path of the wire between the first electrode roller (8) and the second electrode roller (17) and that the third drive stage acts upon the wire electrode in the path of the wire after the second electrode roller (17), in that at least two of the drive stages (4, 10, 20) have a common drive motor (33) for the drive of the wire electrode, in that the drive stages (4, 10, 20) have each at least a drive roller for the drive of the wire electrode, around which the wire electrode is partly or entirely wound, and in that the drive rollers of the drive stages have different diameters, wherein the drive roller of the first drive stage (4) has a smaller diameter than the drive roller of the second drive stage (10) and the drive roller of the third drive stage (20) has a larger diameter than the drive roller of the second drive stage (10).

2. Welding device according to claim 1, characterized in that a deflecting roller (7) which deflects the wire electrode is provided in the path of the wire before the first electrode roller (8), particularly directly before the first electrode roller (8), and in that the diameter of said deflecting roller (7) is in the range of 70% to 30% of the diameter of the first electrode roller (8), and particularly that the diameter of said deflecting roller (7) is of around 50% of the diameter of the first electrode roller (8).

3. Welding device according to claim 1, characterized in that a second deflecting roller (18) which deflects the wire electrode is provided in the path of the wire after the second electrode roller (17), particularly directly after the second electrode roller (17), and in that the diameter of said second deflecting roller (18) is smaller than around 50% of the diameter of the second electrode roller (17), and particularly is in the range of 40% to 20% of the diameter of the second electrode roller (17).

4. Welding device according to claim 1, characterized in that all drive rollers (9 to 16) situated in the path of the wire between the first electrode roller (8) and the second electrode roller (17) have each a diameter which is larger than or equal to the diameter of the first electrode roller (8).

5. Method for welding container bodies which pass between a first and a second electrode roller (8, 17), on which a common wire electrode (25) runs, and wherein the bodies are longitudinally seam welded by electric resistance welding, wherein at least one of the electrode rollers is driven, characterized in that a drive of the wire electrode is provided simultaneously at three positions along the path of the wire by a drive stage (4, 10, 20) each, additionally to the drive of the electrode roller, wherein the wire electrode is actuated before the first electrode roller by a first drive stage, the wire electrode is actuated between the first and the second electrode roller by a second drive stage and the wire electrode is actuated after the second electrode roller by a third drive stage, wherein the wire is elastically stretched in the areas between the drive stages by at least two subsequent drive stages of the three drive stages, in such a way that the second drive is faster than the first drive and/or the third drive is faster than the second drive, in that at least two of the drive stages (4, 10, 20) have a common drive motor (33) for the drive of the wire electrode, in that the drive stages (4, 10, 20) have each at least a drive roller for the drive of the wire electrode, around which the wire electrode is partly or entirely wound, and in that the drive rollers of the drive stages have different diameters, wherein, the drive roller of the first drive stage (4) has a smaller diameter than the drive roller of the second drive stage (10) and the drive roller of the third drive stage (20) has a larger diameter than the drive roller of the second drive stage (10).

6. Method according to claim 5, characterized in that the stretching amounts to around 0.5%.

7. Method according to claim 5, characterized in that the second drive stage drives the wire electrode around 0.1% slower than the welding speed.

8. The method according to claim 5 for longitudinal seam welding of can bodies.

9. Welding device according to claim 1, wherein all three drive stages (4, 10, 20) have a common drive motor (33) for the drive of the wire electrode.

10. Method according to claim 5, wherein all three drive stages (4, 10, 20) have a common drive motor (33) for the drive of the wire electrode.

* * * * *